(12) United States Patent
Lemonides

(10) Patent No.: US 9,073,584 B2
(45) Date of Patent: Jul. 7, 2015

(54) DEFLECTOR FOR INCREASING FUEL EFFICIENCY OF A VEHICLE

(71) Applicant: Dimitri Lemonides, Brooklyn, NY (US)

(72) Inventor: Dimitri Lemonides, Brooklyn, NY (US)

( * ) Notice: Subject to any disclaimer, the term of this patent is extended or adjusted under 35 U.S.C. 154(b) by 0 days.

(21) Appl. No.: 14/286,122

(22) Filed: May 23, 2014

(65) Prior Publication Data

US 2014/0306483 A1    Oct. 16, 2014

Related U.S. Application Data

(63) Continuation-in-part of application No. 13/605,131, filed on Sep. 6, 2012, now Pat. No. 8,764,078.

(51) Int. Cl.
*B62D 35/00* (2006.01)

(52) U.S. Cl.
CPC ............ *B62D 35/004* (2013.01); *B62D 35/001* (2013.01)

(58) Field of Classification Search
CPC ............................ B62D 35/004; B62D 35/001
USPC .............................. 293/102, 120; 40/200, 209
See application file for complete search history.

(56) References Cited

U.S. PATENT DOCUMENTS

| | | | |
|---|---|---|---|
| 1,699,191 A * | 1/1929 | Holmes | 40/202 |
| 2,280,558 A * | 4/1942 | Thompson | 362/505 |
| D684,509 S * | 6/2013 | Noll | D12/172 |
| 2005/0218672 A1* | 10/2005 | Mustafa et al. | 293/109 |
| 2006/0156595 A1* | 7/2006 | Kasak et al. | 40/209 |

* cited by examiner

*Primary Examiner* — Joseph D Pape
(74) *Attorney, Agent, or Firm* — Lowenstein Sandler LLP

(57) ABSTRACT

An apparatus for increasing the fuel efficiency of a vehicle is disclosed. The apparatus comprises a deflector configured to attach to a front bumper of the vehicle, the deflector comprising a first surface area facing towards the vehicle when the deflector is attached to the vehicle, the first surface area being a substantially rectangle shape, the first surface area having a width, a height and a vertical axis, the vertical axis substantially bisecting the width of the first surface area, a second surface area facing away from the vehicle when the deflector is attached to the vehicle, the second surface area being a substantially concave shape with respect to the vertical axis, and a recessed well configured to align with a hole on the front bumper of the vehicle.

10 Claims, 13 Drawing Sheets

Top view

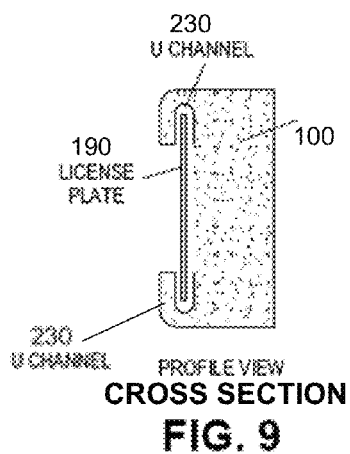
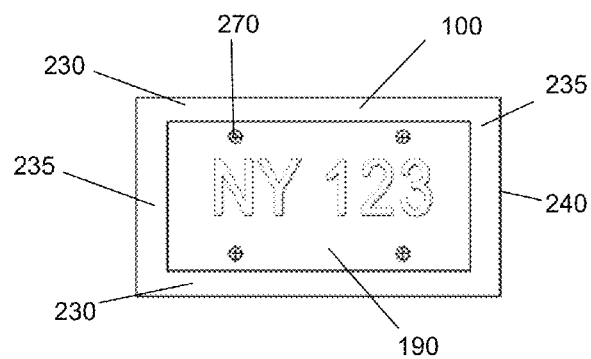
FIG. 9
CROSS SECTION
FIG. 10
FRONT VIEW
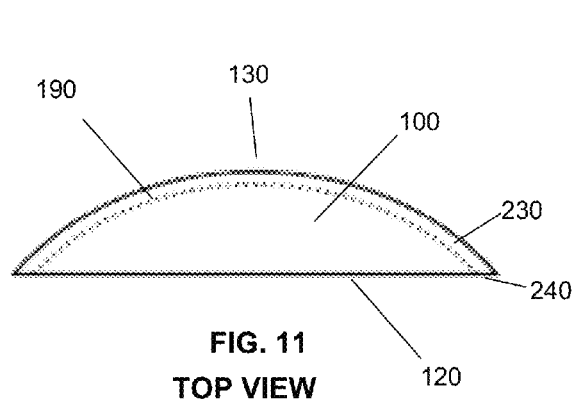
FIG. 11
TOP VIEW
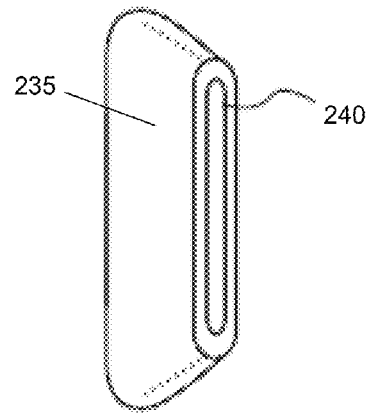
FIG. 12
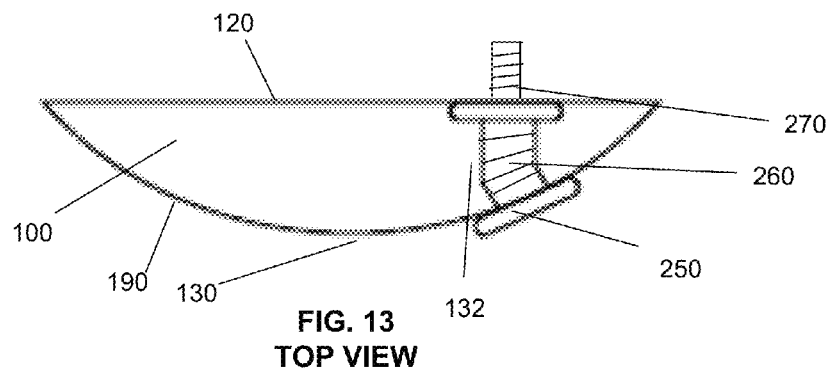
FIG. 13
TOP VIEW

DEFLECTOR FOR INCREASING FUEL EFFICIENCY OF A VEHICLE

CROSS-REFERENCE TO RELATED APPLICATIONS

The present application is a continuation-in-part of U.S. patent application Ser. No. 13/605,131, titled "Deflector for Increasing Fuel Efficiency of a Vehicle", filed on Sep. 6, 2012, which claims the benefit of U.S. Provisional Application Ser. No. 61/532,261, titled "Deflector for Increasing Fuel Efficiency of a Vehicle", filed on Sep. 8, 2011. The entire contents of U.S. patent application Ser. No. 13/605,131 and U.S. Provisional Application Ser. No. 61/532,261 are incorporated by reference herein.

TECHNICAL FIELD

The present invention relates generally to a deflector for increasing vehicle fuel efficiency, and more specifically, to convex-shaped deflector which may be attached or engaged to a vehicle's front bumper to reduce drag forces and increase fuel efficiency.

BACKGROUND

Ever since the automobile gained widespread popularity beginning in the early 1900s, drivers and vehicle manufacturers alike have struggled to enhance the fuel economy of their vehicles. The average fuel economy of a vehicle depends on many different factors including the size, shape and weight, driving and maintenance habits of the driver and the type and size of engine. Many compact and hybrid cars can achieve fuel economies of greater than 40 miles per gallon while large tractor trailers have fuel economies in the range of 3-5 miles per gallon. Recent data suggests that the average fuel economy of all vehicles in the United States is about 21 miles per gallon. With the average car in the United States being driven 12,000 miles per year, each car, on average consumes nearly 600 gallons of gasoline per year. The number of gallons of gasoline consumed each year in the United States becomes truly staggering when the number of vehicles (greater than 250 million) is factored in. Apart from the fuel costs related to operating a motor vehicle, the environmental impacts from burning fossil fuels are significant. Global warming and increased air pollution have been linked to burning fossil fuels. Therefore, reducing the amount of gasoline consumed in the United States would have positive economic and environment effects.

Many devices have been introduced over the years for improving a vehicle's fuel efficiency. For example, U.S. Patent Publication Number 2008/0054677 teaches a drag reducing vehicle attachment to a vehicle. However, such an attachment is formed from a rigid, transparent material that is configured to be in front of a license plate and therefore does not allow for shock absorption upon impact with another vehicle or object. Other devices claim to increase fuel efficiency by magnetically aligning gasoline molecules to promote more efficient combustion. Others purport to condition a vehicle's electrical system to achieve greater efficiency. Despite grand claims, devices such as these have been shown to provide virtually no increase in fuel efficiency. Other methods such as chemical fuel additives have been shown to provide modest increases in fuel efficiency, but not enough to justify the added cost.

Therefore, with the cost of gasoline rising due to increasing demand and geopolitical conflict, a need exists in the art for a device capable of increasing a vehicle's fuel economy.

SUMMARY OF THE INVENTION

The above-described problems are addressed and a technical solution is achieved in the art by the deflector for increasing fuel efficiency of a vehicle described herein. According to one or more embodiments of the present invention, a deflector for increasing a vehicle's fuel efficiency is described which comprises one or more inflatable bladders configured in a generally convex shape being removably engaged to a front bumper of a vehicle to reduce drag forces when the vehicle is driven.

In another embodiment, a deflector for increasing a vehicle's fuel efficiency is described which comprises a dense foam material configured in a generally convex shape being removably engaged to a front bumper of a vehicle to reduce drag forces when the vehicle is driven. In yet another embodiment, a deflector for increasing a vehicle's fuel efficiency is described which comprises a dense foam material configured in a generally convex shape for accepting a vehicle license plate and being removably engaged to a front license plate mount of a vehicle.

BRIEF DESCRIPTION OF THE DRAWINGS

The present invention will be more readily understood from the detailed description of exemplary embodiments presented below considered in conjunction with the attached drawings, of which:

FIG. 9 is a cross-section profile view of a deflector for increasing a vehicle's fuel efficiency, according to an embodiment of the present invention;

FIG. 10 is a front view of a deflector for increasing a vehicle's fuel efficiency, according to an embodiment of the present invention;

FIG. 11 is a top view of a deflector for increasing a vehicle's fuel efficiency, according to an embodiment of the present invention;

FIG. 12 is a side view of a deflector for increasing a vehicle's fuel efficiency, according to an embodiment of the present invention; and FIG. 13 is a top view of a deflector for increasing a vehicle's fuel efficiency, according to an embodiment of the present invention.

It is to be understood that the attached drawings are for purposes of illustrating the concepts of the invention and may not be to scale, and are not intended to be limiting in terms of the range of possible shapes and/or proportions.

DETAILED DESCRIPTION OF THE INVENTION

For purposes of this specification, terms are to be given in their plain and ordinary meaning in the context in which they arise as understood by those possessing ordinary skill in the art. To avoid any ambiguity, however, the term "engage" as used herein is intended to include, but is not limited to, any suitable means or method to mount, attach, connect, integrally connect, affix, join, adhere, etc.

Figure 1:
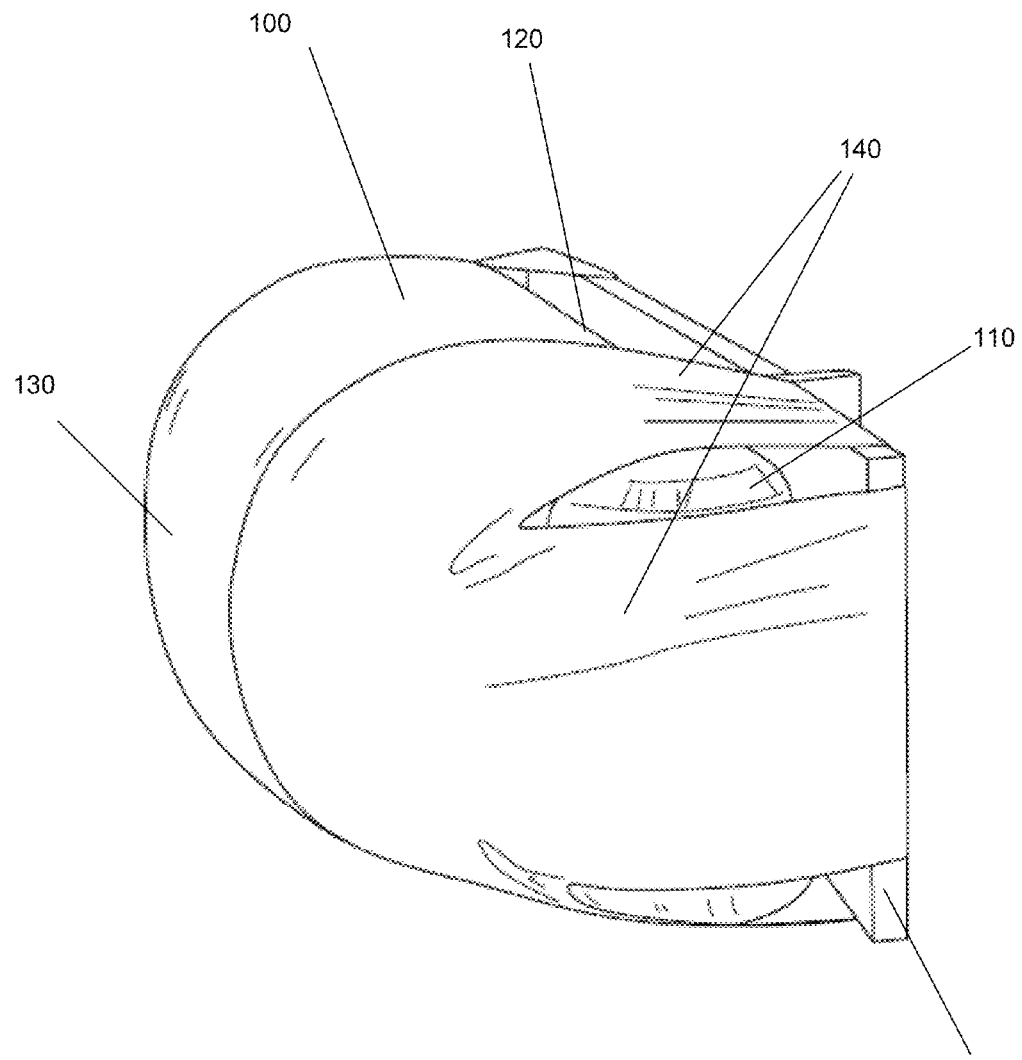
FIG. 1 is a profile view of a deflector for increasing a vehicle's fuel efficiency, according to an embodiment of the present invention.

Referring to FIGS. 1, 2, 3A and 3B, a deflector 100 according to an embodiment of the present invention includes one or more inflatable bladders 110 configured in a generally convex shape surrounded by a protective covering. For purposes of clarity, FIG. 1 illustrates the deflector 100 being engaged to a simulated bumper 160. The bladder 100 may be constructed from any suitable polymeric material such as rubber or poly vinyl chloride. In addition, the bladder 100 may be inflated and deflated via compressed air using a valve such as a Schrader or Presta valve (not shown in FIG. 1), however one having ordinary skill in the art will appreciate that any suitable valve may be used. The number and geometric configuration of the bladder 100 may be varied depending on the particular application.

In alternative embodiments, the deflector 100 may be constructed having a core made of a suitable light material such as high density foam, for example, polyurethane foam, a styrene foam, or an ethylene foam. One having ordinary skill in the art will appreciate that a variety of suitable materials may be used. The foam core may then be covered with a protective covering 140 made of materials such as vinyl or nylon. The protective covering 140 may then be decorated with various colors and graphics depending on the intended application for the deflector and aesthetic preferences. The protective covering 140 may be permanent or permit removal for cleaning or other maintenance by way of a zipper, latch, strap or other suitable means.

Figure 2:
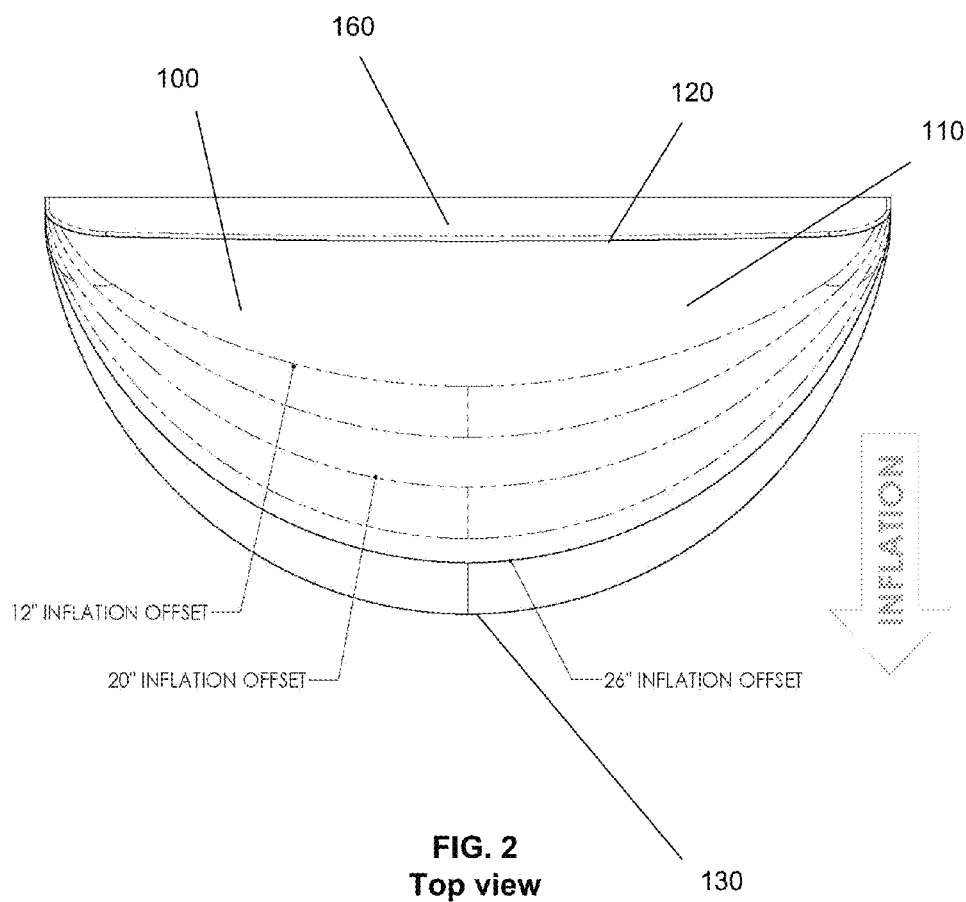
FIG. 2 is a top view of a deflector for increasing a vehicle's fuel efficiency, according to an embodiment of the present invention.

In an example embodiment, the leading face of the deflector 100 may be configured in a generally convex shape when viewed from the top (as shown in FIG. 2) while the back side 120 of the deflector 100 is generally flat to allow for mounting the deflector to the bumper of a vehicle. The top and bottom faces of the deflector may also have a convex curvature although less pronounced than the leading face 130

The convex shape of the leading face 130 of the deflector 100 results in reduced drag force and more streamline and laminar air flow when the vehicle 150 (not shown in FIG. 2) is driven in the forward direction. Reducing the overall drag of a body means that the body can move through fluids such as air with less friction and wind resistance. In the case of an automobile, this reduced wind resistance leads to increased fuel efficiency because the engine requires less fuel to propel the vehicle forward. Contrast this to a bumper 160, without the deflector 100 attached, having a largely flat and rectangular leading face, especially those found on many tractor trailers and pickup trucks. Such flat bumpers 160 act to create significant drag forces and more turbulent air flow which results in reduced fuel efficiency. Flat bumpers 160 are also unable to effectively direct air around the body of the vehicle 150, where additional turbulence and drag can occur. For example, the underside of many large tractor trailers contains features such as engine components that contribute to drag and reduced fuel efficiency. The convex leading face 130 of the deflectors 100 described herein effectively directs air around the vehicle 150 thereby reducing drag and increasing fuel efficiency.

According to an embodiment of the present invention, the degree of curvature of the leading face 130 of the deflector 100 may be varied using inflatable bladders 110. FIG. 2 illustrates various inflation offsets which may be achieved using such bladders. For example, an example embodiment of the deflector 100 may include a bladder 110 with a 12 inch inflation offset 112. In an embodiment, the deflector 100 may include a bladder 110 with a 20 inch inflation offset 114. In an embodiment, the deflector 100 may include a bladder 110 with a 26 inch inflation offset 116. The greater inflation offsets result in reduced drag on the leading face 130 of the deflector 100. In some cases, the drag force on the leading face 130 of the deflector 100 was reduced by 44% when compared to a vehicle 150 without the deflector 100 installed. As noted above, reduced drag results in greater fuel efficiency when the deflector 100 is engaged to the front bumper 160 of a vehicle 100.

The engine compartment of a typical tractor trailer vehicle 150 is only accessible for maintenance by rotating the entire front portion of the vehicle's 150 body panel forward around the axis of the bumper 160. The deflectors 100 described herein may interfere with this rotation. However, body rotation may be achieved by deflating the deflector 100 to make room for the body panel to move forward. After the engine has been serviced, and the body moved back into position, the deflector 100 may be easily re-inflated using a standard tire pump or air compressor.

Figure 2A:
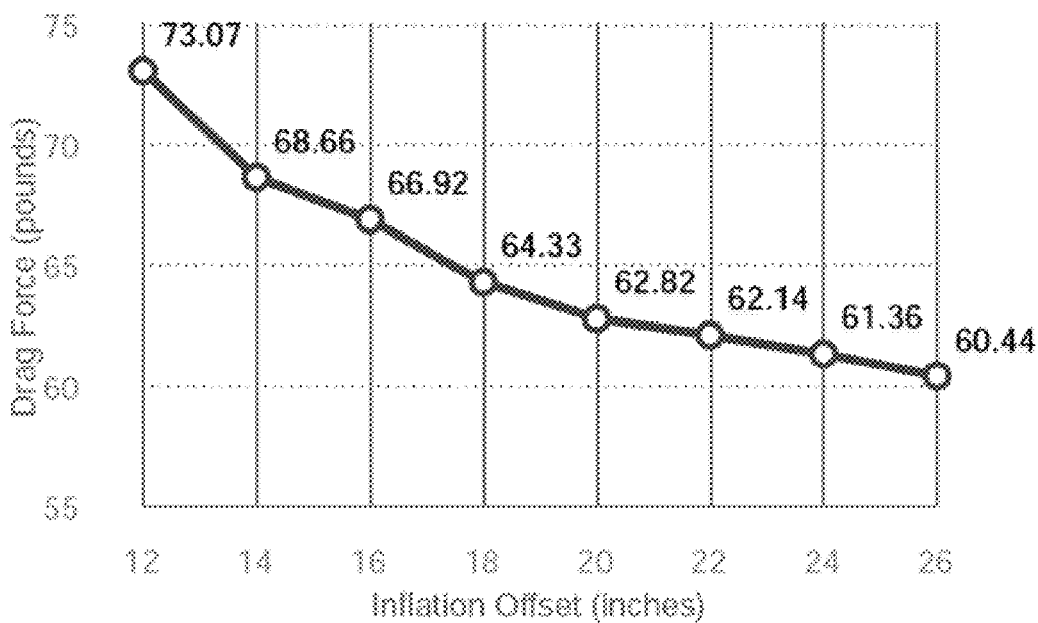
FIG. 2A and FIG. 2B illustrate certain embodiments of the present invention.
Figure 2B:
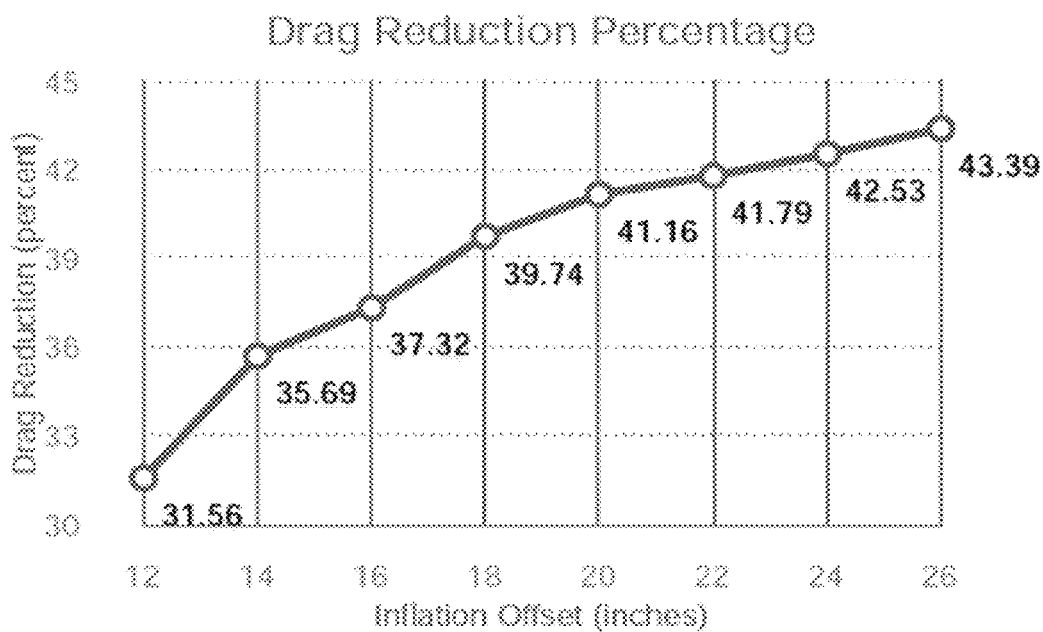

Referring to FIGS. 2A and 2B, different configurations of the deflector 100 with bumper design dimensions having a height of 18 inches, a length of 72 inches and with an inflation offset ranging from 12 inches to 26 inches in 2 inch increments were evaluated with Computational Fluid Dynamics (CFD) simulation experiments to assess the resulting flow field at a speed of 70 miles per hour. Using CFD calculations, the drag force for a deflector 100 with no inflation offset is calculated to be 106.76 pounds when pushed by the tractor trailer vehicle 150 traveling at 70 miles per hour. When attaching a deflector 100 having an inflation offset of 12 inches, the drag force is reduced to 73.07 pounds (FIG. 2A), resulting in a 31.56% reduction in drag force (FIG. 2B). Similarly, for example, when attaching a deflector 100 having an inflation offset of 20 inches, the drag force is reduced to 62.82 pounds, resulting in a 41.16% reduction in drag force.

Figure 3A:
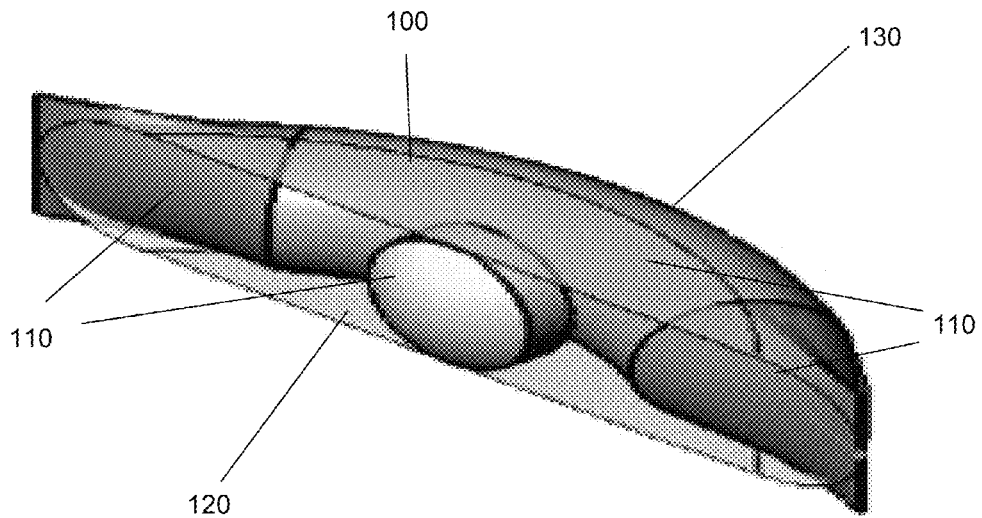
FIGS. 3A and 3B illustrate an interior view of a deflector for increasing a vehicle's fuel efficiency, according to an embodiment of the present invention.
Figure 3B:
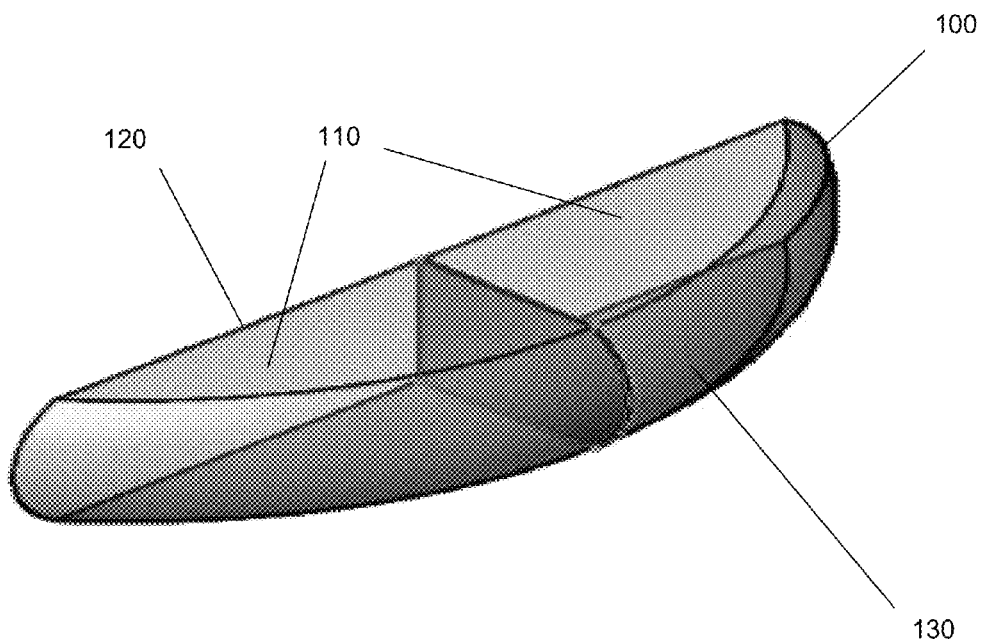

FIGS. 3A and 3B illustrate each embodiment of deflector 100 having a leading face 130, a back side 120, and multiple bladders 110 with different shapes and sizes which may be used to form the deflector 100. In addition, each bladder 100 may be inflated and deflated independently of the other bladders 100. This redundant configuration is advantageous in the event one bladder 100 becomes deflated due to damage.

Figure 4:
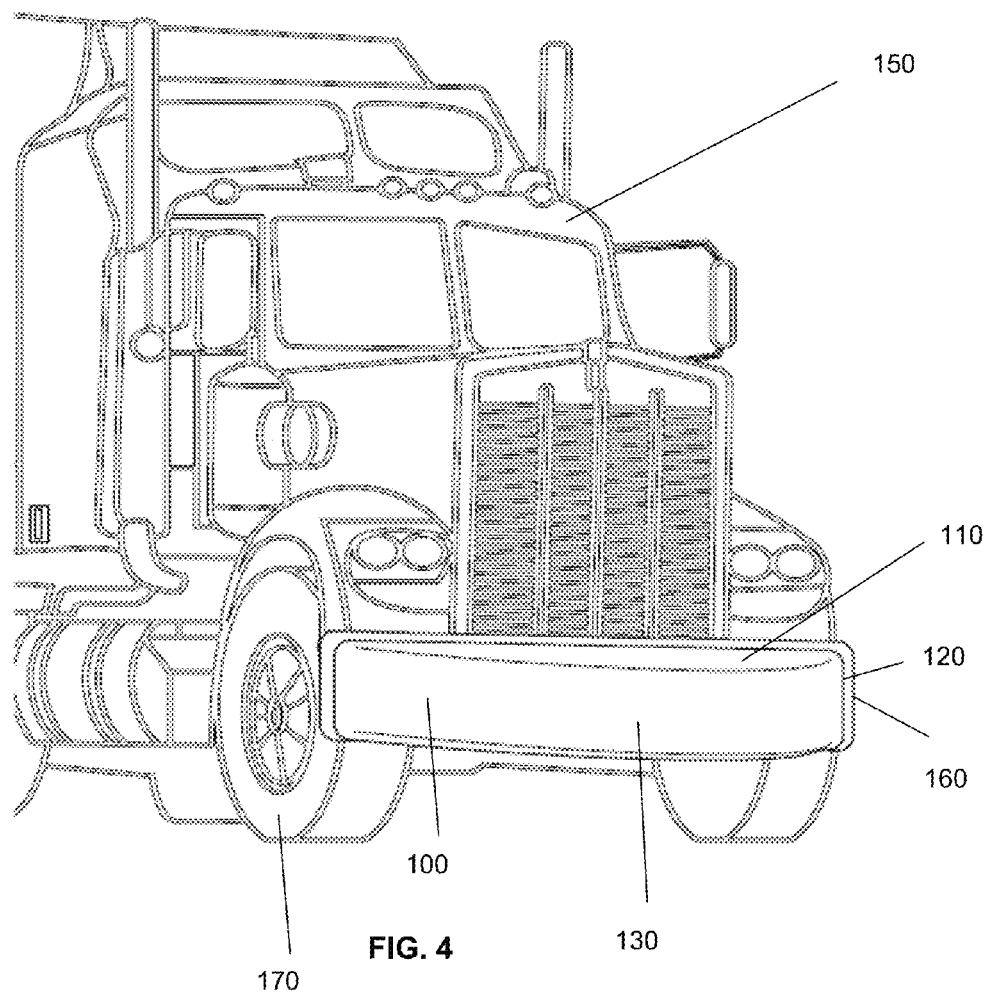
FIG. 4 is a front view of a deflector for increasing a vehicle's fuel efficiency, according to an embodiment of the present invention.

The ability to inflate and deflate the deflector 100 also makes it easier to install on a tractor trailer type of vehicle 150 as shown in FIG. 4.

FIG. 4 illustrates an embodiment of the deflector 100 having a leading face 130, a bladder 110, and a back side 120 attached to the bumper 160. As discussed above, the height of the deflector 100 may be 18 inches and the length may be 72 inches to substantially conform to the dimensions of a bumper 160 on a standard tractor trailer vehicle 150. The dimensions of the deflector 100 may range from a height of 10 inches to 24 inches, and a length of 60 inches to 94 inches. It is understood that the greater the surface area of the bumper, the greater the drag force. Therefore, the greater the dimensions of the height and length of the deflector 100, the greater the percentage of reduction of the drag force that is exerted on the vehicle 150 and bumper 160 with the attached deflector 100, as compared to the drag force that is exerted on a vehicle 150 and bumper 160 without the attached deflector 100. In an embodiment, the deflector 100 may include a mounting platform being substantially integral with leading face, wherein the mounting platform is configured to attach an electronic toll-collection transponder.

Figure 5:
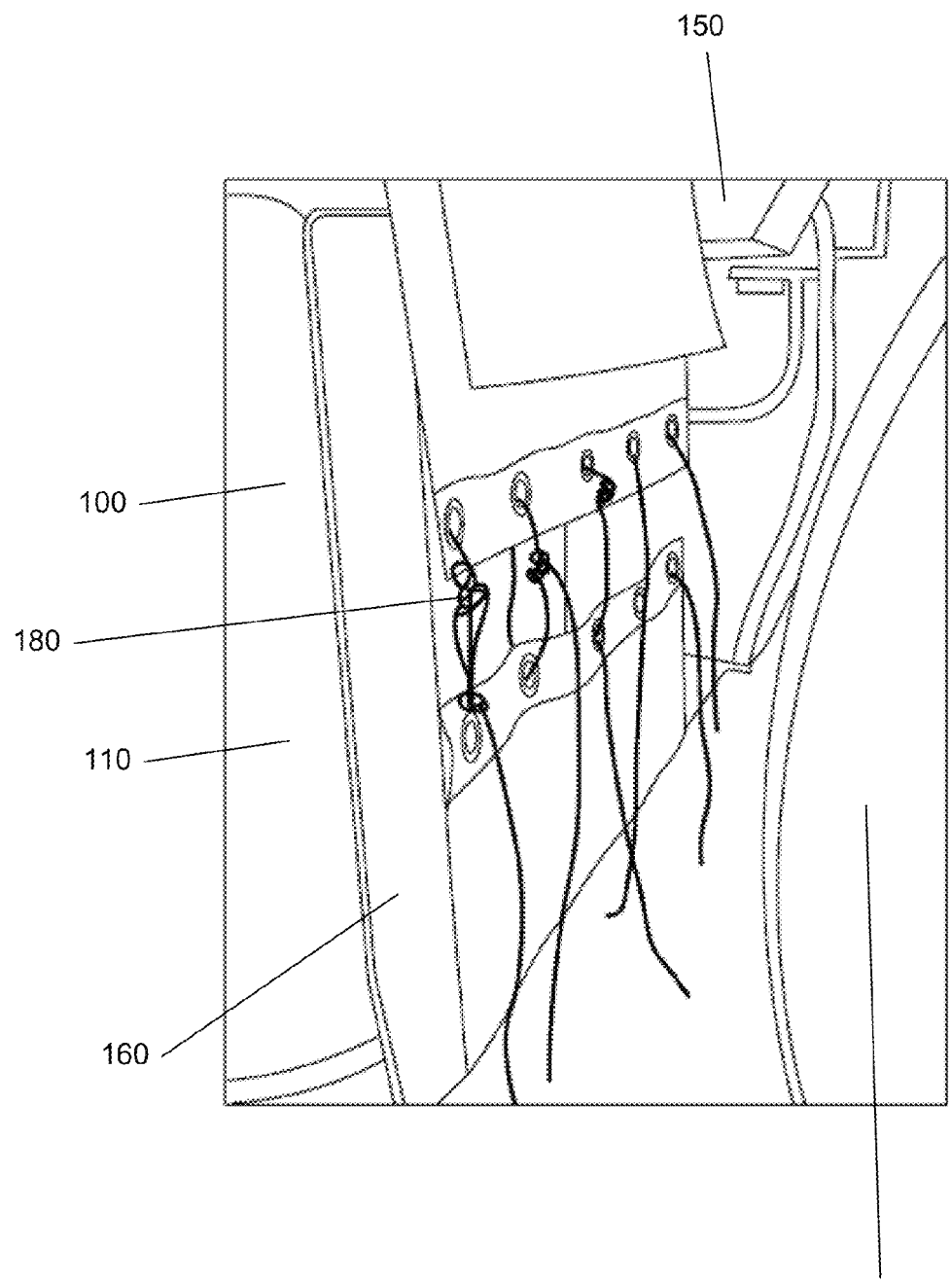
FIG. 5 is a rear view of a deflector for increasing a vehicle's fuel efficiency, according to an embodiment of the present invention.

FIG. 5 illustrates an embodiment in which the deflector 100 may be engaged to the front bumper 160 of a vehicle 150 using fasteners 180 in a manner as to not impede with the function of the wheel 170. In an embodiment, the fasteners 180 may be a set of straps and lashings, however one having ordinary skill in the art will appreciate that a variety of suitable methods exist for engaging the deflector 100 to a vehicle bumper 160 depending on the particular geometry of the bumper 160.

Figure 6:
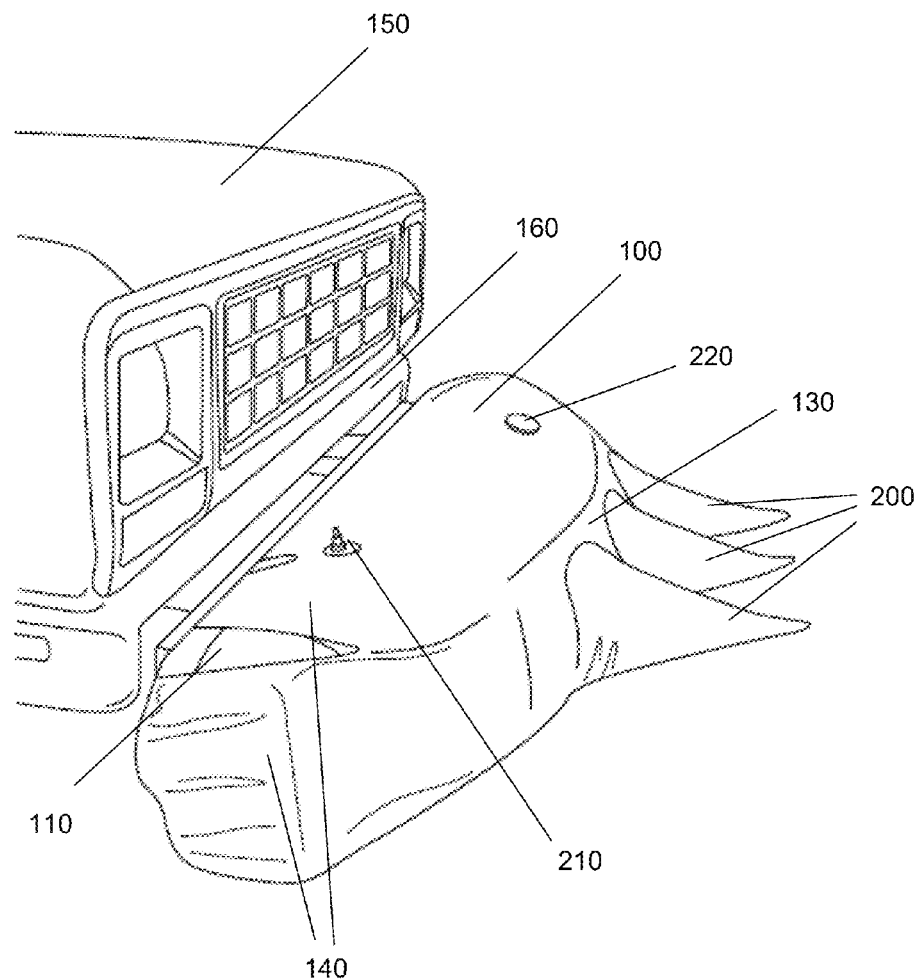
FIG. 6 is a profile view of a deflector for increasing a vehicle's fuel efficiency, according to an embodiment of the present invention.

FIG. 6 illustrates a deflector 100 having a bladder 110, a protective cover 140, an inflatable valve 210, a plug 220, and cone 200 attached to the bumper 160 of vehicle 150. The cone 200 may act to further reduce drag on the leading face 130 of the deflector 100 by directing air flow around the deflector 100. One having ordinary skill in the art will appreciate that the size, shape and placement of such cone 200 may vary depending on the particular application. The cone 200 may be formed integrally with the deflector 100 by way of an inflatable bladder 110 or a foam core. In some embodiments, the cone 200 may be removable from the deflector 100 to allow use of the deflector 100 without the cone 200 or for use with interchangeable structures. Apart from the functional aspects that the cone 200 provides, they also provide a novel decorative element. One having ordinary skill in the art will appreciate the decorative possibilities such shapes present.

Figure 7:
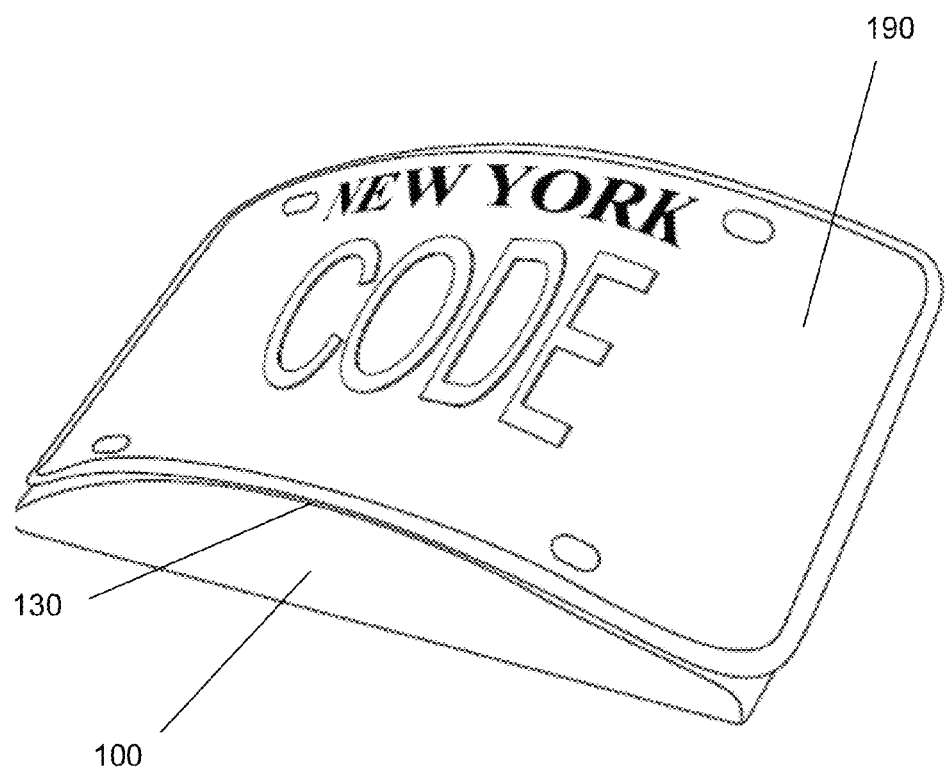
FIG. 7 is a perspective view of a deflector for increasing a vehicle's fuel efficiency, according to an embodiment of the present invention.

According to an embodiment of the present invention and referring to FIG. 7, the deflector 100 may be constructed for use with a passenger vehicle 150 where aesthetics are of primary concern. In this embodiment, the deflector 100 is approximately the width and height of a standard car license plate 190 and has a similar convex-shaped leading face 130 as the other embodiments. It is generally understood that the dimensions of a license plate 190 in the United States is a height of 6 inches and a width of 12 inches, however, one of ordinary skill in the art would understand that the dimensions may vary according among different countries and locales (e.g., many European countries require a license plate 190 to have a height of 4.5 inches and a width of 20.5. inches).

Figure 8:
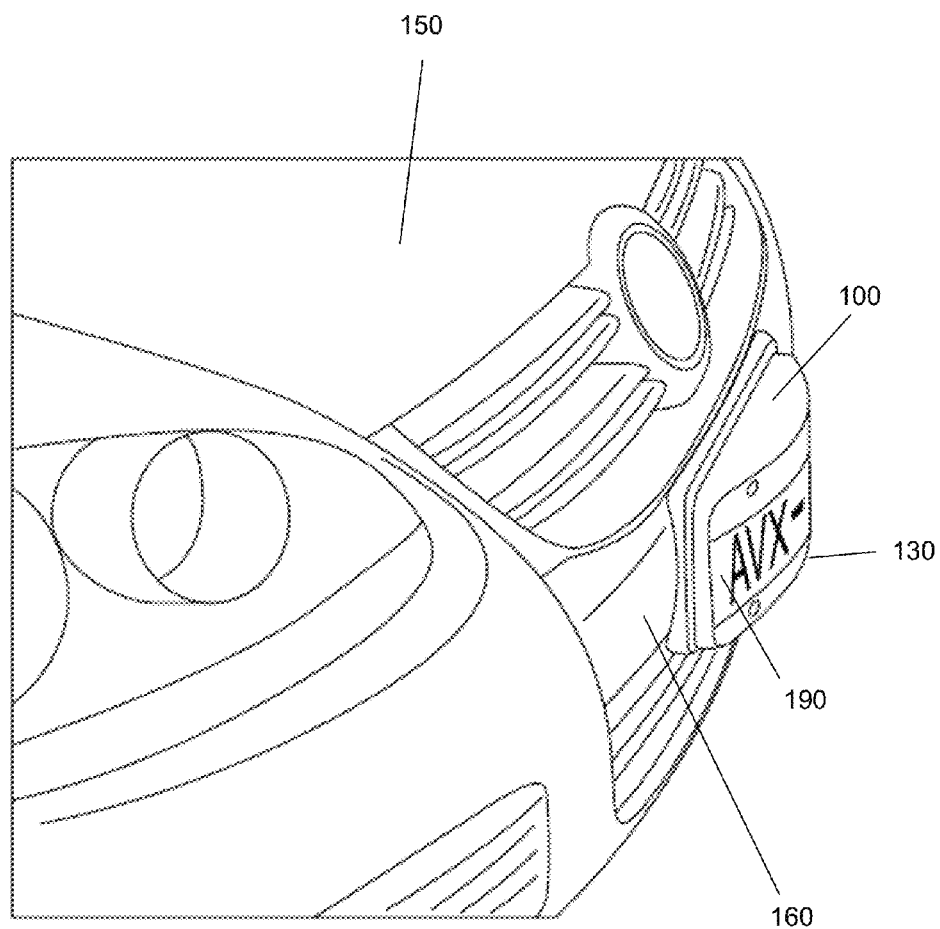
FIG. 8 is a profile view of a deflector for increasing a vehicle's fuel efficiency, according to an embodiment of the present invention.

The deflector 100 may be engaged on or attached to the front license plate holder or the bumper 160 of a vehicle 150 as shown in FIG. 8. The core of the deflector 100 may be constructed from any suitable light material such as a high density foam, however one having ordinary skill in the art will appreciate that a wide variety of materials are available for such purpose. The vehicle's front license plate 190 may then be formed into a convex shape around the leading edge 130 of the deflector 100. In jurisdictions that do not require a front license plate 190, the deflector 100 can be covered with a vanity plate or other protective or decorative coating. In an embodiment, the deflector 100 may include a mounting platform being substantially integral with leading face, wherein the mounting platform is configured to attach an electronic toll-collection transponder.

According to an embodiment of the present invention, in addition to reducing drag forces on the front bumper of the vehicle 150 (and hence increasing fuel efficiency), the deflector 100 shown in FIGS. 7 and 8 may be constructed of a suitable material for absorbing minor bumper impacts, thereby protecting the vehicle's bumper 160 from scratches and other superficial damage. The deflector 100 also protects other vehicles or objects from potential damage. For example, the deflector 100 may absorb most or all of the impact of a collision, thereby preventing the other vehicle or object from being scratched or dented. This may reduce the liability of the owner or driver of the vehicle 150. Such a deflector 100 is particularly useful in urban environments that require owners to regularly parallel-park their vehicle 150 into tight parking spaces.

FIGS. 9-12 illustrate an embodiment for securing the license plate 190 to the deflector 100.

FIG. 9 is a cross section profile view of the deflector 100 having an integrated U channel 230 on the each of the top side and the bottom side of the deflector 100. The U channel 230 may be configured such that the license plate 190 may slide in from a side of the deflector 100. It is generally understood that the license plate 190 is a thin metal sheet that is sufficiently flexible to conform to the curvature of the deflector 100. The U channel 230 is generally constructed of a rigid material such as, for example, metal, steel, plastic, or a combination thereof. In an embodiment, the U channel 230 may be coated with a material such as vinyl.

FIG. 10 is a front view of the deflector 100 having an integrated U channel 230 on the top side and the bottom side of the deflector 100 to secure the license plate 190 to the deflector 100. A side of the deflector 100 may have a slot 240 as an initial point of entry for the license plate 190 to attach to the deflector 100. The slot 240 may be formed by a band 235 or strip of rigid material similar to that of the U channel 230. The band 235 may be on each side of the deflector 100. The band 235 which forms the slot 240 may be attached to or integral with the U channel 230 such that when the license plate 190 is in its proper position, the license plate 190 may be secured to the deflector 100 by the top and bottom U channels 230 and by the bands 235 on each side of the deflector 100. A screw 270 may be used to secure the license plate 190 and the deflector 100 to the vehicle 150.

FIG. 11 is a top view of the deflector 100 having an integrated U channel 230 on the top side (the U channel 230 on the bottom side of the deflector 100 is not shown) to secure the license plate 190 to the deflector 190. The slot 240 and the leading face 130 and back side 120 of the deflector 100 are respectively noted in FIG. 11.

FIG. 12 is a close-up illustration of the slot 240 in a side of the deflector 100. In this embodiment, the slot 240 may be formed by a band 235 or a strip of rigid material such as, for example metal, steel, plastic, or a combination thereof, and may be coated with vinyl. In an embodiment, the U channels 230 may extend from the top and bottom of the band 235, respectively to form a rectangular shape frame for securing the license plate 190 to the deflector 100.

FIG. 13 illustrates an embodiment for securing the license plate 190 and the deflector 100 to a vehicle 150 by a configuring a grommet 250, a spring 260, and a screw 270 in such a manner to prevent or mitigate the damage that may be inflicted upon impact with another vehicle or object. The deflector 100 includes a recessed well 132 that can be used to secure the deflector to a vehicle. The configuration may also absorb shock upon impact to the grommet 250, thereby, mitigating the damage upon the vehicle that is attached to the deflector 100. As discussed above, the deflector 100 also protects other vehicles or objects from potential damage. For example, the deflector 100 may absorb most or all of the impact of a collision, thereby preventing the other vehicle or object from being scratched or dented. This may reduce the liability of the owner or driver of the vehicle 150. In this embodiment, the grommet 250 is attached to a first end of the spring 260. A second end of the spring 260 is attached to the screw 270. The screw 270 attaches the deflector 100 to the vehicle 150. The diameter of the grommet 250 is larger than the hole in the license plate 190, which enables the grommet 250 and the spring 260 to secure the license plate 190 to the deflector 100. The grommet 250 is substantially flush with the license plate 190. The leading face 130 and back side 120 of the deflector 100 are respectively noted in FIG. 13.

Figure 14:
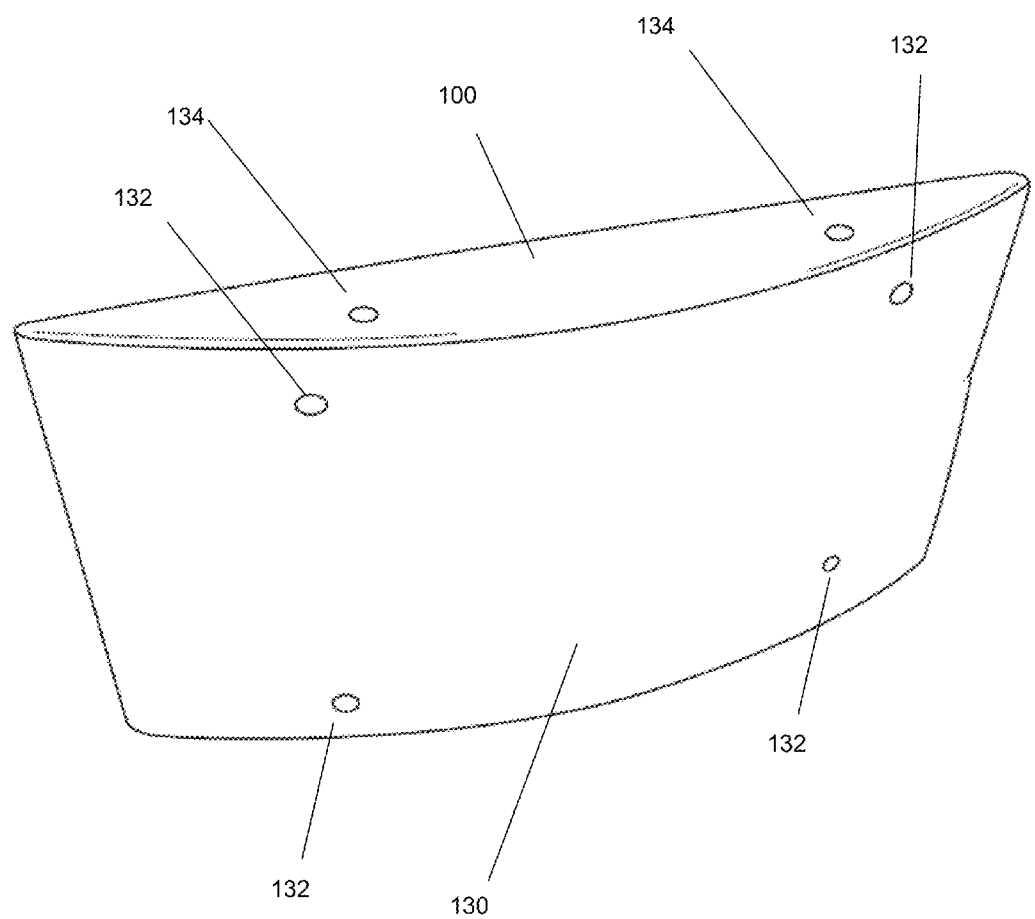
FIG. 14 is a view of a deflector for increasing a vehicle's fuel efficiency, according to an embodiment of the present invention.

FIG. 14 is a view of a deflector 100 for increasing a vehicle's fuel efficiency. According to an embodiment of the present invention and referring to FIG. 7 and FIG. 13, the leading edge 130 of the deflector 100 can include recessed wells 132. Each recessed well 132 can be configured to align with a hole for attaching a license plate to the front bumper of a vehicle. The front bumper of a vehicle typically has four holes that can be used to attach to bolts or screws 270 to secure a license plate to the vehicle. The recessed wells 132 enable the deflector 100 to be attached to the vehicle by using the screws or bolts (not shown in FIG. 14) that can protrude through a hole in the recessed well 132. The recessed wells 132 help to prevent or mitigate the damage that may be inflicted upon impact with another vehicle or object because the screws 270 that can be used to attach the deflector 100 to the vehicle are not exposed because of the recessed well 132, therefore, the screws 270 do not touch the bumper of another vehicle upon impact.

In an embodiment, the deflector 100 can be configured to attach a license plate to the second surface area. The deflector 100 can include a first channel on a top side of the deflector and a second channel on a bottom side of the deflector, wherein the first channel and the second channel are configured to secure the license plate to the deflector. In an embodiment, the first channel and the second channel comprise at least one of a strip of rigid metal, steel, or plastic.

In an embodiment, the deflector 100 can include a hole 134 that is oriented substantially parallel to a vertical axis of the deflector 100. The hole 134 can be used to secure a frame 300 to the deflector 100 as discussed in further detail below with respect to FIG. 15 and FIG. 16.

Figure 15:
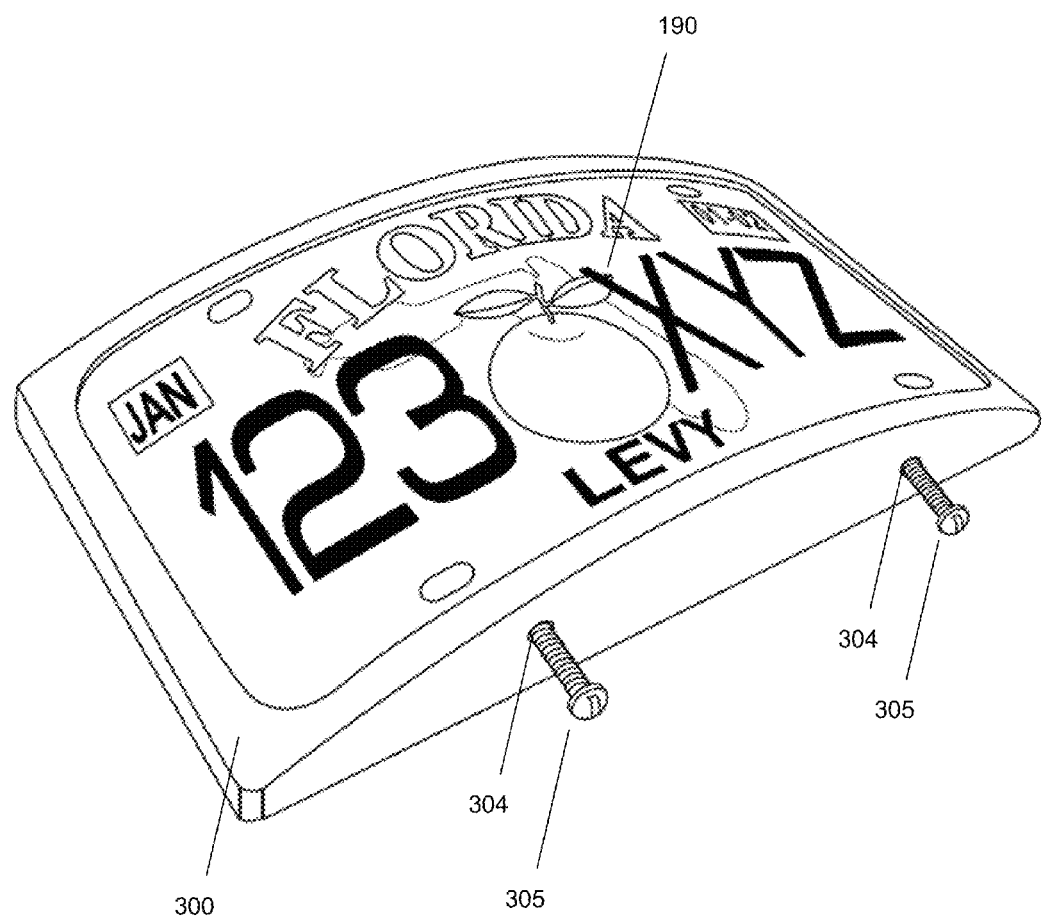
FIG. 15 is a view of a deflector for increasing a vehicle's fuel efficiency, according to an embodiment of the present invention.

FIG. 15 is a view of a frame 300 that can be attached to a deflector 100 for increasing a vehicle's fuel efficiency, according to an embodiment of the present invention. In an embodiment, the frame 300 can be configured to attach to the deflector 100, wherein the frame 300 is configured to secure a license plate 190 between the frame 300 and the deflector 100. In an embodiment, the frame 300 can be made of a rigid material such as metal, steel, or plastic or the like. In an embodiment, the frame 300 can be made of a flexible material such as rubber, hard rubber, and the like. In an embodiment, the frame 300 can include a vinyl coating to provide protection from scratching or damaging another vehicle's bumper upon impact. In an embodiment, the frame 300 can include the first channel and the second channel, wherein the first and the second channels form a slot that can secure a license plate 190 to the frame 300.

In an embodiment, the frame 300 includes a hole 304 for a screw or a bolt 305 that can be used to attach the frame 300 to the deflector 100. In an embodiment, the bolt 305 can be inserted through the hole 304 and oriented substantially parallel to a vertical axis of the deflector 100 so that the bolt 305 is not exposed in such a manner that it would contact another vehicle's bumper upon impact.

Figure 16:
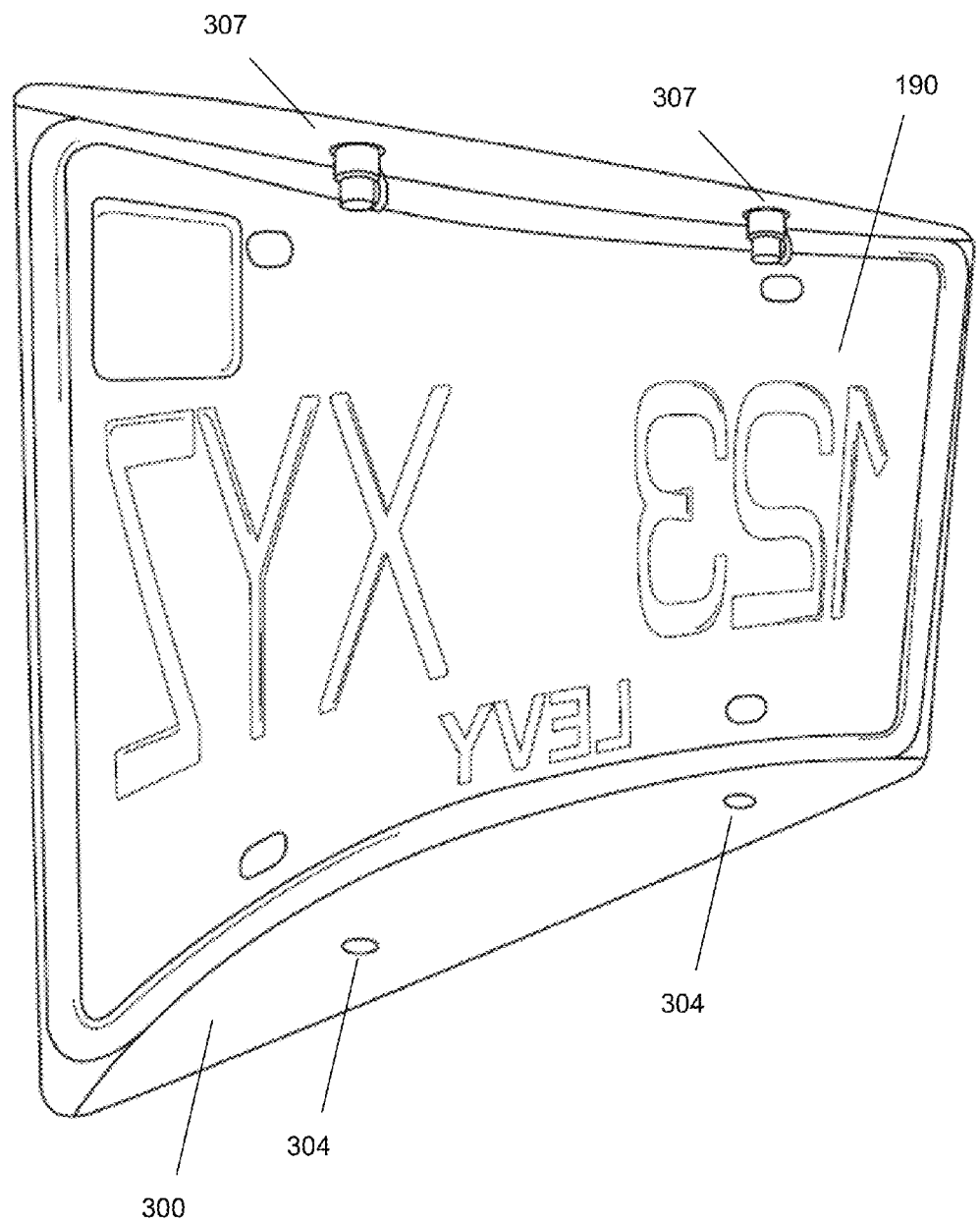
FIG. 16 is a view of a deflector for increasing a vehicle's fuel efficiency, according to an embodiment of the present invention.

FIG. 16 is a rear view of the frame 300 that can be attached to a deflector 100 for increasing a vehicle's fuel efficiency, according to an embodiment of the present invention. The frame 300 can include a fastener with a threaded hole such as a nut 307 that is attached to the frame 300. The nut 307 can align with the hole 304 such that the bolt 305 can be inserted through the hole 304, then through the hole 134 as shown in FIG. 14, and fastened to the nut 307. This configuration enables the frame 300 to be attached to the deflector 100 such that the bolt 305 is oriented substantially parallel to the vertical axis of the deflector 100. Such vertical orientation of the bolt 305 relative to the deflector 100 can minimize the damage to another vehicle upon impact because the bolt 305 is not exposed to the other vehicle.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. An apparatus comprising:
   a deflector configured to attach to a front bumper of a vehicle, the deflector comprising:
   a first surface area facing towards the vehicle when the deflector is attached to the vehicle, the first surface area being a substantially rectangle shape, the first surface area having a width, a height and a vertical axis, the vertical axis substantially bisecting the width of the first surface area;
   a second surface area facing away from the vehicle when the deflector is attached to the vehicle, the second surface area being a substantially concave shape with respect to the vertical axis;
   a recessed well configured to align with a hole on the front bumper of the vehicle; and
   a frame configured to securely attach to the deflector via a screw, wherein the screw is oriented substantially parallel to a vertical axis of the deflector.

2. The apparatus of claim 1 wherein the deflector is configured to attach a license plate to the second surface area.

3. The apparatus of claim 1 wherein the deflector is constructed from at least one of a high density foam material or a rubber material.

4. The apparatus of claim 3, wherein the high density foam material is at least one of polyurethane foam, styrene foam, or ethylene foam.

5. The apparatus of claim 2, the deflector further comprising a first channel on a top side of the deflector and a second channel on a bottom side of the deflector, wherein the first channel and the second channel are configured to secure the license plate to the deflector.

6. The apparatus of claim 5, wherein the first channel and the second channel comprise at least one of a strip of rigid metal, steel, or plastic.

7. The apparatus of claim 1, wherein the frame is configured to secure a license plate between the frame and the deflector.

8. The apparatus of claim 7, wherein the screw is placed inside a recessed well formed on a leading face of the deflector.

9. The apparatus of claim 7, wherein the frame comprises a vinyl coating.

10. The apparatus of claim 1, further comprising a frame configured to attach to the deflector, the frame comprising a first channel and a second channel, wherein the first channel and the second channel are configured to secure a license plate to the frame.

* * * * *